United States Patent
Dorward

(10) Patent No.: US 12,038,104 B2
(45) Date of Patent: Jul. 16, 2024

(54) NON-METALLIC, FLEXIBLE ASSEMBLY FOR MITIGATION OF VORTEX SHEDDING IN CYLINDRICAL STRUCTURES

(71) Applicant: Saudi Arabian Oil Company, Dhahran (SA)

(72) Inventor: Scott Garnet Dorward, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 197 days.

(21) Appl. No.: 17/680,001

(22) Filed: Feb. 24, 2022

(65) Prior Publication Data
US 2023/0265944 A1    Aug. 24, 2023

(51) Int. Cl.
*F16L 1/12* (2006.01)
*E21B 17/00* (2006.01)
*E21B 17/01* (2006.01)

(52) U.S. Cl.
CPC ............ *F16L 1/123* (2013.01); *E21B 17/006* (2013.01); *E21B 17/01* (2013.01)

(58) Field of Classification Search
CPC ...... E21B 17/01; E21B 17/012; E21B 17/006; B63B 21/50; B63B 2021/504; F15D 1/10; F16L 1/123; F16L 57/00; E02B 17/003
See application file for complete search history.

(56) References Cited

U.S. PATENT DOCUMENTS

| | | | | |
|---|---|---|---|---|
| 3,978,677 | A | * | 9/1976 | Lochridge ............... H02G 1/10 193/38 |
| 4,102,137 | A | * | 7/1978 | Porraz ..................... E02B 3/127 405/172 |
| 4,244,156 | A | | 1/1981 | Watts, Jr. |
| 4,398,487 | A | * | 8/1983 | Ortloff ................ B63B 35/4413 166/367 |
| 4,410,012 | A | * | 10/1983 | Redding ................. B29C 48/19 138/121 |
| 4,722,367 | A | * | 2/1988 | Swink ...................... F15D 1/10 138/144 |
| 5,044,826 | A | * | 9/1991 | Forster .................... E21B 17/01 166/359 |

(Continued)

OTHER PUBLICATIONS crpsubsea.com [online], "VIV (vortex induced vibration) strakes," retrieved on Feb. 10, 2022, retrieved from URL <https://www.crpsubsea.com/products/product-families/bend-fatigue-protection/viv-vortex-induced-vibration-strakes/>, 6 pages.

(Continued)

*Primary Examiner* — Edwin J Toledo-Duran
(74) *Attorney, Agent, or Firm* — Fish & Richardson P.C.

(57) ABSTRACT

A vortex-shedding mitigation assembly includes a jacket sufficiently flexible to lay substantially flat under its own weight and that is comprised of a woven, non-metallic material. The assembly further includes a fin row comprising a plurality of discrete fins protruding from the jacket and arrayed in series diagonally across the jacket such that, when the jacket is wrapped around a cylindrical structure, the fin row forms a helical strake having an axis substantially parallel to an axis of the cylindrical structure. The helical strake is operable to induce turbulence in a fluid flowing past the cylindrical structure, thereby reducing vibration of the cylindrical structure induced by vortex shedding from the fluid flow.

18 Claims, 4 Drawing Sheets

(56) References Cited

U.S. PATENT DOCUMENTS

| | | | | |
|---|---|---|---|---|
| 5,275,120 A * | 1/1994 | Ruffa | ............... | F15D 1/10 |
| | | | | 114/243 |
| 5,279,368 A * | 1/1994 | Arnott | ............... | F16L 58/16 |
| | | | | 138/143 |
| 5,920,032 A * | 7/1999 | Aeschbacher | ............... | H01B 7/16 |
| | | | | 174/113 C |
| 6,019,549 A * | 2/2000 | Blair | ............... | F15D 1/10 |
| | | | | 52/592.4 |
| 6,347,911 B1 * | 2/2002 | Blair | ............... | E02D 5/60 |
| | | | | 52/592.4 |
| 6,401,646 B1 * | 6/2002 | Masters | ............... | F15D 1/10 |
| | | | | 114/243 |
| 6,575,665 B2 * | 6/2003 | Richter | ............... | E02B 17/025 |
| | | | | 405/195.1 |
| 6,672,803 B2 * | 1/2004 | Richter | ............... | B63B 1/048 |
| | | | | 405/203 |
| 6,695,540 B1 * | 2/2004 | Taquino | ............... | E21B 17/01 |
| | | | | 405/211 |
| 6,896,447 B1 * | 5/2005 | Taquino | ............... | F16L 1/123 |
| | | | | 405/211 |
| 6,953,308 B1 * | 10/2005 | Horton | ............... | E21B 15/02 |
| | | | | 405/195.1 |
| 7,147,402 B2 * | 12/2006 | Edfeldt | ............... | F16L 57/02 |
| | | | | 405/159 |
| 7,600,945 B2 * | 10/2009 | Burgess | ............... | F15D 1/12 |
| | | | | 405/211 |
| 8,408,154 B2 * | 4/2013 | Haney | ............... | B63B 21/502 |
| | | | | 405/211 |
| 8,579,546 B2 * | 11/2013 | Masters | ............... | B29C 45/14622 |
| | | | | 405/216 |
| 9,511,825 B1 * | 12/2016 | Henning | ............... | B63B 39/06 |
| 9,588,074 B2 * | 3/2017 | Demanze | ............... | F16L 11/127 |
| 9,803,431 B1 * | 10/2017 | Allen | ............... | E21B 17/01 |
| 11,261,670 B1 * | 3/2022 | Allen | ............... | E21B 17/01 |
| 11,261,675 B2 * | 3/2022 | Allen | ............... | E21B 17/01 |
| 2001/0036387 A1 * | 11/2001 | Richter | ............... | E02B 17/025 |
| | | | | 405/224.1 |
| 2002/0119271 A1 * | 8/2002 | Quigley | ............... | F16L 9/147 |
| | | | | 428/36.9 |
| 2004/0099324 A1 * | 5/2004 | Fraser | ............... | F16L 11/081 |
| | | | | 138/144 |
| 2008/0050181 A1 * | 2/2008 | Masters | ............... | E21B 17/01 |
| | | | | 405/211 |
| 2008/0131210 A1 * | 6/2008 | Wajnikonis | ............... | E21B 17/01 |
| | | | | 405/211 |
| 2008/0236469 A1 * | 10/2008 | Masters | ............... | F16L 1/123 |
| | | | | 114/243 |
| 2009/0185868 A1 * | 7/2009 | Masters | ............... | F15D 1/10 |
| | | | | 405/211 |
| 2010/0307762 A1 * | 12/2010 | Howard | ............... | F16L 1/24 |
| | | | | 166/350 |
| 2012/0018025 A1 * | 1/2012 | Chen | ............... | F16L 11/082 |
| | | | | 156/190 |
| 2012/0037063 A1 * | 2/2012 | Backes | ............... | E21B 43/0122 |
| | | | | 114/312 |
| 2014/0116564 A1 * | 5/2014 | McNab | ............... | E21B 17/1035 |
| | | | | 138/137 |
| 2019/0218866 A1 | 7/2019 | Allen | | |
| 2020/0141517 A1 | 5/2020 | Esselbrugge et al. | | |
| 2020/0191317 A1 * | 6/2020 | McBride | ............... | F16L 59/08 |

OTHER PUBLICATIONS lankhorst_offshore.com [online], "VIV Strakes," 2022, retrieved on Feb. 10, 2022, retrieved from URL <https://www.lankhorst-offshore.com/en/viv-strakes>, 4 pages.

Li et al., "Investigation on the spoiler vibration suppression mechanism of discrete helical strakes of deep-see riser undergoing vortex-induced vibration," International Jountal of Mechanical Sciences, Apr. 2020, 172:105410.

wikipedia.com [online], "Vortex shedding," Oct. 2021, retrieved on Feb. 10, 2022, retrieved from URL <https://en.wikipedia.org/wiki/Vortex_shedding>, 3 pages.

* cited by examiner

NON-METALLIC, FLEXIBLE ASSEMBLY FOR MITIGATION OF VORTEX SHEDDING IN CYLINDRICAL STRUCTURES

TECHNICAL FIELD

This disclosure relates to mitigation of vortex shedding in structural tubes and other cylindrical structures or objects.

BACKGROUND

Cylindrical structures or objects (such as pipelines, chimneys, refinery stacks, and tubular structural members) exposed to flowing fluids, such as water or air, can be subject to certain stresses. Vortex shedding is an oscillating flow that takes place when a fluid such as air or water flows past the cylindrical structure at certain velocities, depending on the size and exact shape of the structure. The fluid flow past the structure creates alternating low-pressure vortices on its downstream side. Because the structure tends to bend or move toward the low-pressure vortex, the structure (or a portion of the structure) can begin to resonate, vibrating with harmonic oscillations driven by the energy of the flow. Such oscillations can damage or destroy the structure, particularly when the vortex shedding frequency becomes close to a natural fundamental frequency of vibration of the structure.

To mitigate vortex shedding, a helical fin, vane, or similar corkscrew or helical structure (sometimes called a "strake") or a series of such structures can be fitted to the external surface of the cylindrical structure. The strake induces turbulence in the in the fluid flow, reducing the amplitude of the resonant load frequency and reducing vortex-induced vibration. For example, a strake in the form of a continuous helical metallic fin can be welded to the exterior of a refinery chimney stack, thus reducing vortex shedding effects caused by exposure of the chimney stack to strong winds.

SUMMARY

Certain aspects of the subject matter herein can be implemented as a vortex-shedding mitigation assembly. The assembly includes a jacket sufficiently flexible to lay substantially flat under its own weight and that is comprised of a woven, non-metallic material. The assembly further includes a fin row comprising a plurality of discrete fins protruding from the jacket and arrayed in series diagonally across the jacket such that, when the jacket is wrapped around a cylindrical structure, the fin row forms a helical strake having an axis substantially parallel to an axis of the cylindrical structure. The helical strake is operable to induce turbulence in a fluid flowing past the cylindrical structure, thereby reducing vibration of the cylindrical structure induced by vortex shedding from the fluid flow.

An aspect combinable with any of the other aspects can include the following features. The jacket can include a hook strip of a hook-and-loop fastener along a first edge of the jacket a loop strip of the hook-and-loop fastener along a second edge of the jacket. The jacket can be configured such that the hook strip and the loop strip overlap when the jacket is wrapped around the cylindrical structure and bind when compressed together, thereby fastening the jacket to the cylindrical structure.

An aspect combinable with any of the other aspects can include the following features. The hook strip can be rectangular. The length of the hook strip can be substantially parallel with the axis of the cylindrical structure when the jacket is wrapped around the cylindrical structure. A total width of the jacket can be substantially equal to the width of the hook strip plus the circumference of the cylindrical structure.

An aspect combinable with any of the other aspects can include the following features. The length of the hook strip can be substantially equal to the length of the jacket.

An aspect combinable with any of the other aspects can include the following features. At least some of the plurality of discrete fins can have a height of about ten percent of the diameter of the cylindrical structure.

An aspect combinable with any of the other aspects can include the following features. At least some of the plurality of discrete fins can have a height of about twenty percent of the diameter of the cylindrical structure.

An aspect combinable with any of the other aspects can include the following features. At least some of the plurality of discrete fins have a height-to-length ratio of about 3:5.

An aspect combinable with any of the other aspects can include the following features. At least some of the plurality of discrete fins can be comprised of a polymer material.

An aspect combinable with any of the other aspects can include the following features. At least some of the plurality of discrete fins can protrude from the jacket substantially perpendicular to a surface of the cylindrical structure.

An aspect combinable with any of the other aspects can include the following features. At least some of the plurality of fins can be affixed to a respective base member, and the respective base member can have a substantially flat lower surface substantially parallel with a surface of the cylindrical structure.

An aspect combinable with any of the other aspects can include the following features. A length of the jacket can be substantially equal to a height of the cylindrical structure.

An aspect combinable with any of the other aspects can include the following features. A length of at least some of the plurality of discrete fins can be substantially parallel with the axis of the cylindrical structure when the jacket is wrapped around the cylindrical structure.

An aspect combinable with any of the other aspects can include the following features. A lead length of the helical strake can be about five times the diameter of the cylindrical structure.

An aspect combinable with any of the other aspects can include the following features. The length of the jacket can be equal to or greater than a lead length of the helical strake.

An aspect combinable with any of the other aspects can include the following features. The jacket can include a plurality of fin rows and a plurality of strakes can be formed when the jacket is wrapped around the cylindrical structure.

An aspect combinable with any of the other aspects can include the following features. The helical strake can include at least fifteen discrete fins per lead length.

An aspect combinable with any of the other aspects can include the following features. The jacket can be rectangular in shape.

Certain aspects of the subject matter herein can be implemented as a method of mitigating vibration of a cylindrical structure induced by vortex shedding of a fluid flowing past the cylindrical structure. The method includes securing, by a fastener, a jacket around the cylindrical structure. The jacket can include a fin row that includes a plurality of discrete fins protruding from the jacket and arrayed in series diagonally across the jacket. The jacket is sufficiently flexible to lay substantially flat under its own weight and includes a woven, non-metallic material. Securing of the jacket around the cylindrical structure forms a helical strake with an axis substantially parallel to the axis of the cylindrical structure. The method further includes inducing, by the helical strake, turbulence in the fluid flowing past the cylindrical structure, thereby reducing vibration of the cylindrical structure induced by the vortex shedding.

An aspect combinable with any of the other aspects can include the following features. The fastener can include a hook-and-loop fastener. Securing of the jacket around the cylindrical structure includes compressing and thereby binding together a hook strip of a hook-and-loop fastener positioned along a first edge of the jacket with a loop strip of the hook-and-loop fastener positioned along a second edge of the jacket.

An aspect combinable with any of the other aspects can include the following features. The jacket can be rectangular in shape.

The details of one or more embodiments are set forth in the accompanying drawings and the description below. Other features, objects, and advantages will be apparent from the description and drawings, and from the claims.

DETAILED DESCRIPTION

The details of one or more implementations of the subject matter of this specification are set forth in this detailed description, the accompanying drawings, and the claims. Other features, aspects, and advantages of the subject matter will become apparent from this detailed description, the claims, and the accompanying drawings.

In accordance with some embodiments of the present disclosure, a vortex shedding mitigation assembly for a cylindrical structure can comprise a flexible, lightweight jacket that can be easily stored and transported. The jacket can be rectangular or otherwise quadrilateral in shape. The assembly forms helical strakes when the jacket is wrapped around the cylindrical structure. The strakes can induce turbulence in a fluid flowing past the cylindrical structure and thereby reduce vibration of the cylindrical structure caused by vortex shedding. Because the strakes in some embodiments of the present disclosure are comprised of a series of relatively short, discrete fins (rather than relatively long, continuous fin or fins), mechanical stresses (such as bending or torque) on the strake and other components of the mitigation assembly are minimized despite folding, wrapping, unwrapping, laying out flat, flexing, or other configuration of the assembly.

The mitigation assembly in some embodiments, can include a hook-and-loop fastener or other similar fastening mechanism to enable the jacket to be easily and cost-effectively affixed to and removed from a cylindrical structure with a minimum of (or no) tools, without damage to (or wear and tear on) the mitigation assembly or the cylindrical structure.

Figure 1:
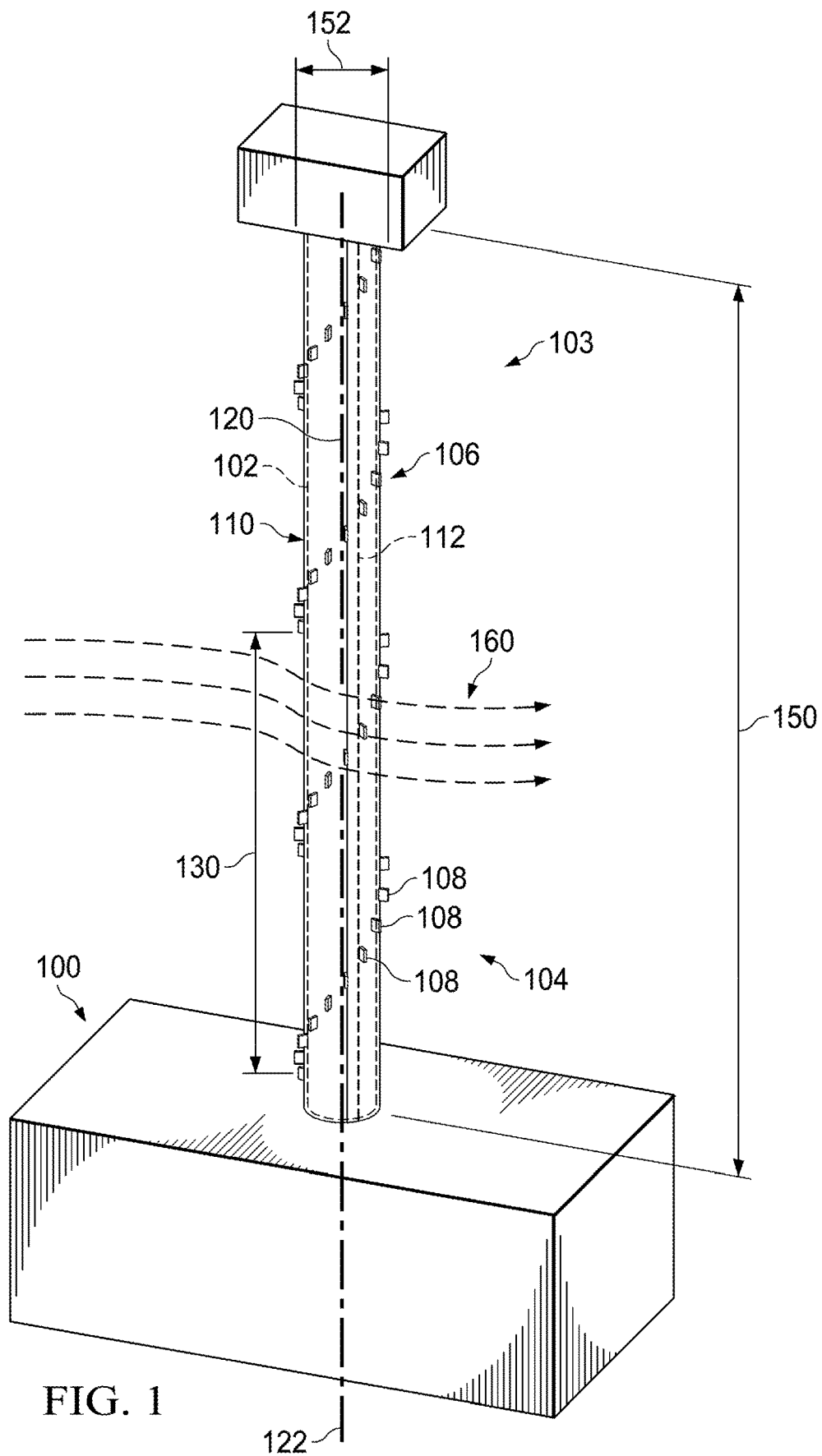
FIG. 1 is a schematic illustration of a vortex shedding mitigation assembly installed on a cylindrical structure accordance with an embodiment of the present disclosure.

FIG. 1 is a schematic illustration of a vortex shedding mitigation assembly installed on a cylindrical structure accordance with an embodiment of the present disclosure. Referring to FIG. 1, cylindrical structure 102 is a component of a construction 100. Construction 100 can be a building, refinery, oil rig, or other built or engineered structure. Cylindrical structure 102 can be a chimney, stack, tubular member, pipeline, power line, or other structure or component that is cylindrical or substantially cylindrical in cross-section. Cylindrical structure 102 has an axis 122. Height 150 and diameter 152 of cylindrical structure 102 can be any suitable height and diameter. "Cylindrical" as used herein means perfectly cylindrical or substantially cylindrical. In some embodiments, cylindrical structure 102 is perfectly cylindrical; in some embodiments, cylindrical structure 102 is other than perfectly cylindrical.

In the illustrated embodiment, the vortex-shedding mitigation assembly 103 comprises helical strakes 104 and 106 that are positioned around the outer circumference of cylindrical structure 102. Helical strakes 104 and 106 can induce turbulence in a fluid 160 flowing past the cylindrical structure 102, thereby reducing vibration of the cylindrical structure induced by vortex shedding from flow of fluid 160. In the illustrated embodiment, each of strakes 104 and 106 are each formed by rows of discrete fins 108. As explained in greater detail in reference to FIG. 2, strakes 104 and 106 are formed by wrapping jacket 110 around cylindrical structure 102.

In the illustrated embodiment, jacket 110 is fastened to cylindrical structure 102 by a hook-and-loop fastener 112, and the axis 120 of helical strakes 104 and 106 is parallel or substantially parallel with the axis 122 of cylindrical structure 102. In the illustrated embodiment, the length of jacket 110 is substantially equal to the height 150 of cylindrical structure 102

Each of helical strakes 104 and 106 has a lead length 130; that is, the axial advance of the helix during one complete 360° turn. In some embodiments, the lead length 130 is about five times the diameter 152 of cylindrical structure 102. In some embodiments, the lead length 130 is a greater or lesser length relative to the diameter 152.

Figure 2:
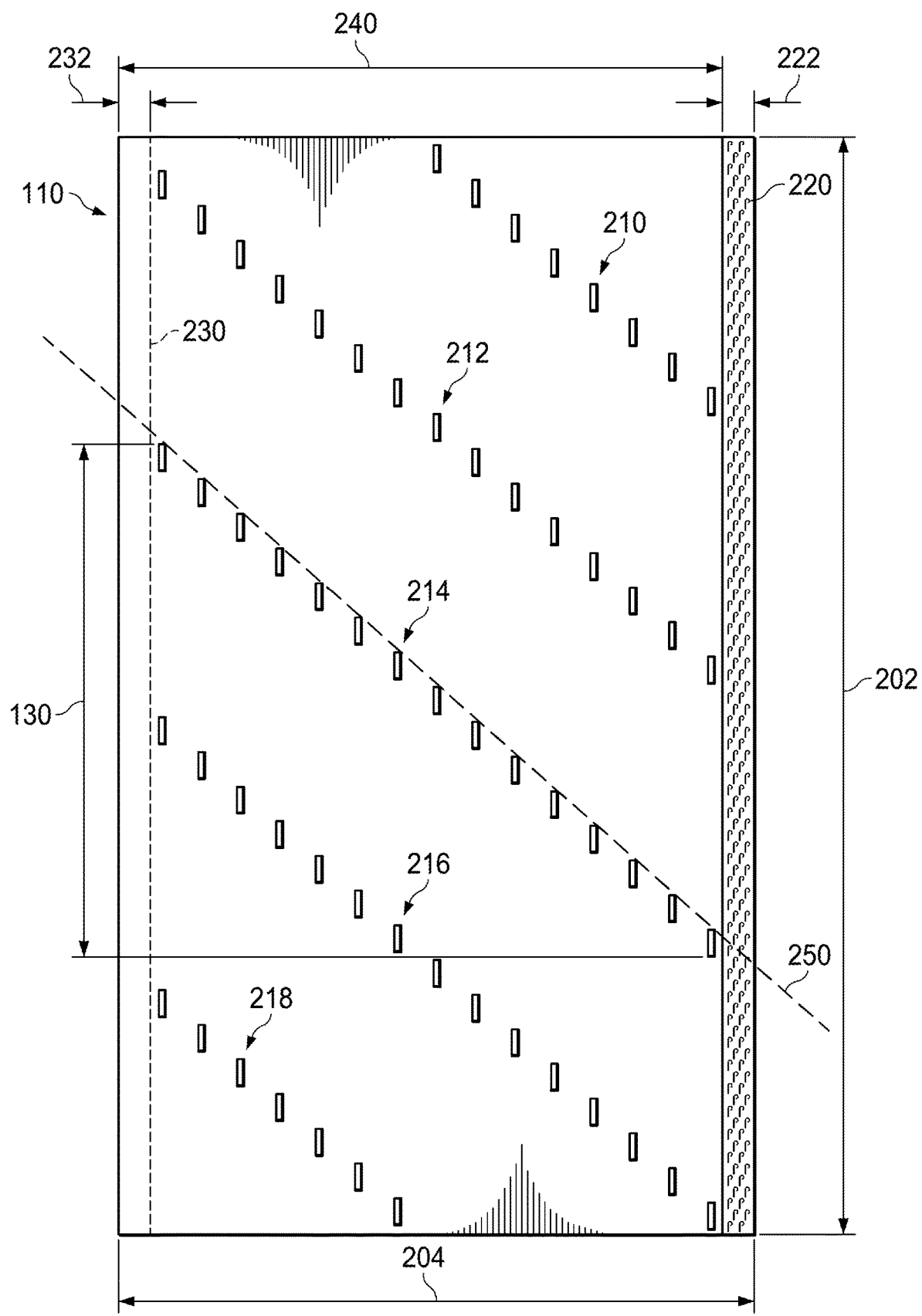
FIG. 2 is a schematic illustration of a vortex shedding mitigation assembly in accordance with an embodiment of the present disclosure.

FIG. 2 is a schematic illustration of the jacket 110 with discrete fins 108 of FIG. 1, in which jacket 110 has been laid flat, in accordance with an embodiment of the present disclosure. Jacket 110 can in some embodiments be quadrilateral in shape. In the illustrated embodiment, for example, jacket 110 is rectangular in shape. Jacket 110 comprises fin rows 210, 212, 214, 216, and 218, each of which comprise a series of discrete fins 108 protruding from and arrayed diagonally across jacket 110. Each of the fin rows are arrayed in series along diagonal lines, and the diagonal lines turn define the helical shapes of the strakes formed by the fin rows when the jacket is wrapped around the cylindrical structure. For example, diagonal line 250 defined by fin row 214 forms a helical strake having lead length 130 when wrapped around cylindrical structure 102 of FIG. 1. In the embodiment shown in FIGS. 1 and 2, the five fin rows (210, 212, 214, 216, and 218) form two strakes (104 and 106) when jacket 110 is wrapped around cylindrical structure 102; in other embodiments, a greater or lesser number of fin rows can form a greater or lesser number of strakes. In some embodiments, a helical strake can comprise ten or more discrete fins per lead length. For example, in embodiments shown in FIGS. 1 and 2, each strake comprises fifteen discrete fins per lead length 130 spaced evenly apart. In other embodiments, some or all of the strakes can comprise a different number of discrete fins per lead length and/or can have varying spacing. In some embodiments with a plurality of strakes, one or more of the strakes can have a greater or lesser number of discrete fins than the other strakes.

In some embodiments, jacket 110 is made of a woven, non-metallic material such as braided and/or woven polymer fabric that is lightweight, provides UV resistance, and is sufficiently flexible to lay substantially flat under its own weight. In other embodiments, jacket 110 can be comprised (in whole or in part) of a different material (for example, a glass, aramid, or carbon fiber or a non-woven neoprene or other chloroprene polymer) and can have a greater or lesser degree of flexibility. In some embodiments, jacket 110 can be a composite material of different materials. In some embodiments, the non-metallic mitigation assembly can be entirely non-metallic. In other embodiments, some components of the non-metallic mitigation assembly can be metallic.

Jacket 110 has a wrap width 240 that in some embodiments is equal to (or substantially equal to) the circumference of the cylindrical structure around which jacket 110 is wrapped. In the illustrated embodiment, jacket 110 includes a hook-and-loop fastener comprising a hook strip 220 along one edge of the jacket (substantially parallel to the length of the jacket) and a loop strip 230 along the opposite edge of the jacket (also substantially parallel to the length of the jacket). The width 222 of hook strip 220 can in some embodiments be the same as (or substantially the same as) width 232 of loop strip 230.

Figure 3A:
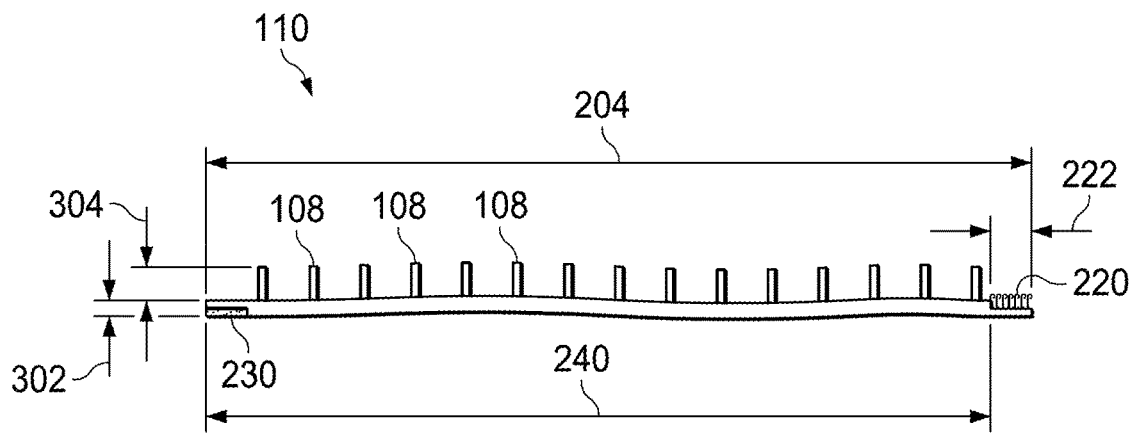
FIGS. 3A and 3B are schematic cross-sectional illustrations of the vortex shedding mitigation assembly of FIGS. 1 and 2, in accordance with an embodiment of the present disclosure.
Figure 3B:
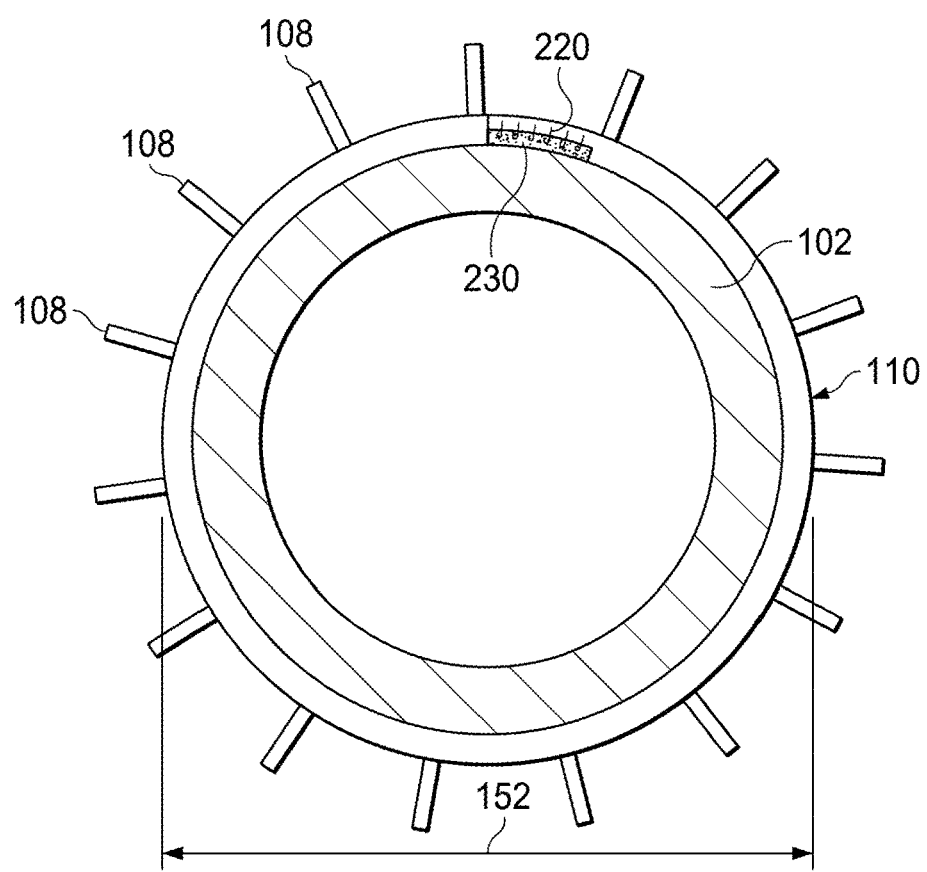

FIGS. 3A and 3B are schematic illustration of jacket 110 of FIGS. 1 and 2 in cross-section when laid out substantially flat (FIG. 3A) and when wrapped around cylindrical structure 102 (FIG. 3B), in accordance with an embodiment of the present disclosure. In the illustrated embodiment, the total width 204 of jacket 110 equals wrap width 240 plus hook strip width 222, such that, when jacket 110 is wrapped around cylindrical structure 102 having a circumference equal to (or substantially equal to) wrap width 240, hook strip 220 and loop strip 230 overlap and can bind when compressed together, thereby fastening the jacket 110 to the cylindrical structure. In other embodiments, in addition to (or instead of) a hook-and-loop fastener, another fastener can be used to fasten the jacket to the cylindrical structure. For example, in some embodiments, rows of grommets long the lengthwise edges of a jacket could be laced together after the jacket is wrapped around the structure.

Thickness 302 of jacket 110 can in some embodiments be about 3 to 10 millimeters. In other embodiments, the jacket can have a greater or lesser thickness, and in some embodiments can have a consistent thickness throughout or a varying thickness. Some or all of discrete fins 108 can, in some embodiments, have a height 304 equal to about twenty percent of the diameter 152 of cylindrical structure 102. Some or all of discrete fins 108 can in some embodiments have a height 304 equal to about ten percent of the diameter 152 of cylindrical structure 102. In some embodiments, some or all of discrete fins can have a greater or lesser height relative to the diameter of the cylindrical structure.

In a vortex-shedding mitigation assembly featuring a relatively long, continuous strake affixed to a flexible jacket, the transition between a laid-out-flat configuration (for example, laid-out flat for storage or transportation) and the configuration in which the jacket is wrapped around the cylinder could result in bending, warping, and/or other stresses on the strake and other components of the mitigation assembly. However, in the illustrated embodiment shown in FIGS. 3A and 3B of the present disclosure, because the strakes are formed by a series of relatively short, discrete fins (rather than a single continuous fin or relatively long fin segment) and are individually oriented substantially parallel to the long axis of cylindrical structure 102 (as shown, for example, in the embodiment illustrated in FIG. 4), warping and other stresses on the fins 108 and other components of the mitigation assembly can be reduced or eliminated, notwithstanding the transitioning between the laid-out (FIG. 3A) and wrapped (FIG. 3B) configuration (or similar such wrapping, folding, unfolding, laying out flat, twisting, or other reconfiguration of the jacket). Thus, transportation, storage, application, and removal of the mitigation assembly can in some embodiments of the present disclosure be more efficient, simpler, more cost effective, and less likely to result in damage the fins or other components of the mitigation assembly.

Figure 4:
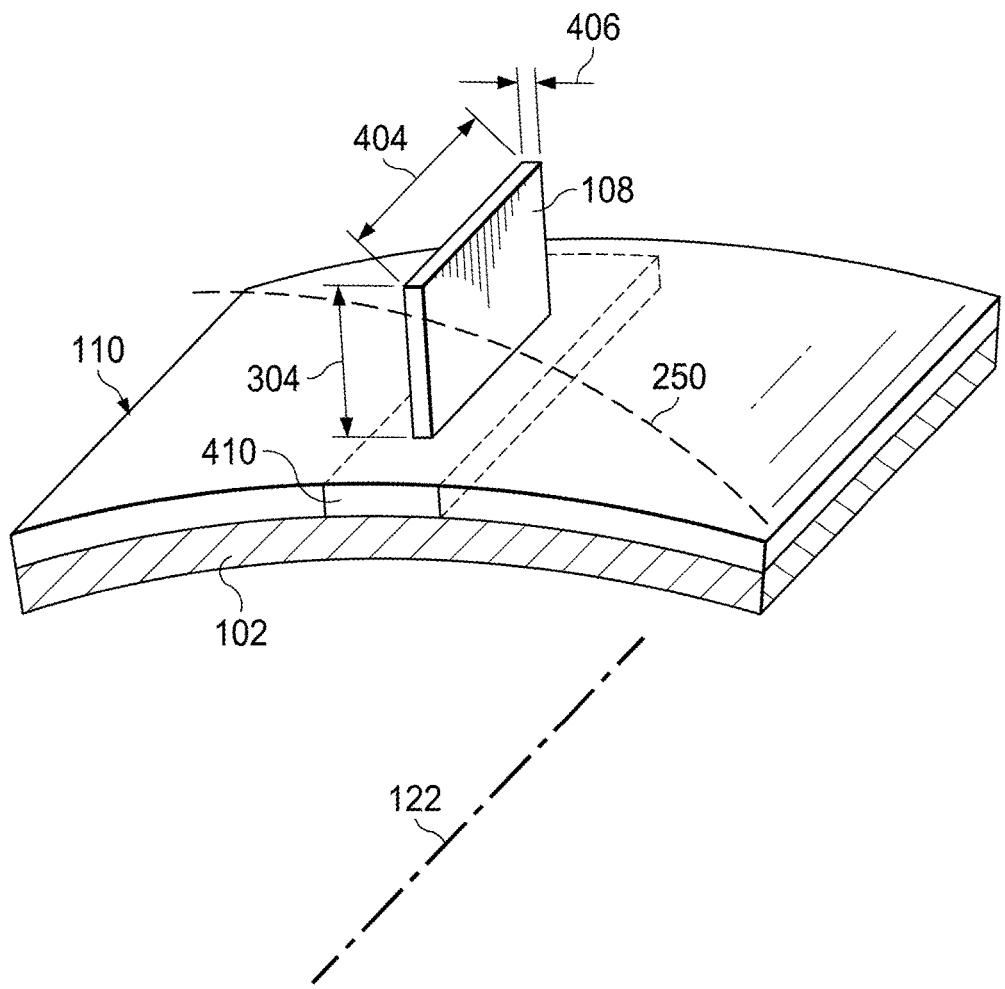
FIG. 4 is a schematic illustration of discrete fins protruding from a jacket of a vortex shedding mitigation assembly in accordance with an embodiment of the present disclosure.

FIG. 4 is a schematic illustration of one of the discrete fins 108 of the preceding figures, protruding from jacket 110 in accordance with embodiments of the present disclosure. As shown in FIG. 4, the fin is affixed perpendicular to solid base member 410 which has a flat lower surface parallel with the surface of cylinder 102, such that the base member 410 serves to orient and firmly maintain fin 108 perpendicular to the outer surface of cylinder 102. In the embodiment shown in FIG. 4 (and as also shown in the preceding figures), discrete fins 108 are laid out in series along helical line 250, with the length 404 of the discrete fins substantially parallel with the axis 122 of the cylinder 102 around which the jacket 110 is (or is configured to be) wrapped. The materials and dimensions of the fins are in some embodiments selected or configured so as to have sufficient stiffness to resist bending or other distortion of the fins caused by the flow of fluid around cylinder 102. In some embodiments, the ratio of height 304 to length 404 is approximately 3:5. For example, in some embodiments, height 304 is about 30 millimeters and length 404 is about 50 millimeters. In some embodiments, fins 108 can have a thickness 406 of about $\frac{1}{10}$th to $\frac{1}{6}$th of height 304. For example, in some embodiments, height 304 is about 30 millimeters and thickness 406 is about three to five millimeters. In some embodiments, fins 108 are comprised of a solid or composite material such as polyethylene. In some embodiments, some or all base members 410 are sewn into jacket 110. In addition or alternatively, in some embodiments, some or all base members 410 are affixed on or within jacket 110 using adhesive, fasteners (metallic or non-metallic), or other devices or methods for fastening or affixing the base members to the jacket.

Figure 5:
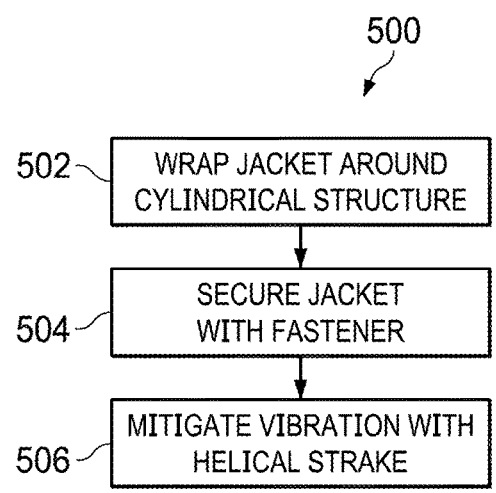
FIG. 5 is a process flow diagram of a method of mitigating vibration of a cylindrical structure induced by vortex shedding, in accordance with an embodiment of the present disclosure.

FIG. 5 is a process flow diagram of a method 500 of mitigating vibration of a cylindrical structure induced by vortex shedding, in accordance with an embodiment of the present disclosure. The method begins at step 502 wherein a jacket is wrapped around a cylindrical structure. The jacket can be, for example, a jacket of the type described above in reference to FIG. 2, and can include a fin row that comprises a plurality of discrete fins protruding from the jacket and arrayed in series diagonally across the jacket. The jacket can be sufficiently flexible to lay substantially flat under its own weight and can be comprised of a woven, non-metallic material. Securing of the jacket around the cylindrical structure forms a helical strake on the structure. The helical strake has an axis parallel to or substantially parallel to the axis of the cylindrical structure.

The method proceeds to step 504 wherein the jacket is secured around the cylindrical structure by a fastener. In some embodiments, the fastener comprises a hook-and-loop fastener, and the securing comprises compressing and thereby binding together a hook strip of the hook-and-loop fastener positioned along a first edge of the jacket with a loop strip of the hook-and-loop fastener positioned along a second edge of the jacket.

Proceeding to step 506, the helical strake formed on the structure by the jacket induces turbulence in the fluid flowing past the cylindrical structure. The turbulence reduces vibration of the cylindrical structure induced by the vortex shedding.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In this disclosure, "approximately" or "substantially" mean a deviation or allowance of up to 10 percent (%) and any variation from a mentioned value is within the tolerance limits of any machinery used to manufacture the part. Likewise, "about" can also allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

What is claimed is:

1. A vortex-shedding mitigation assembly, comprising:
   a jacket comprising a woven, non-metallic material, the jacket configured to be wrapped around a cylindrical structure, configured to be unfolded and folded, and configured to lay substantially flat under its own weight when unfolded; and
   a plurality of fin rows, each fin row comprising a plurality of discrete fins protruding from the jacket, wherein, when the jacket is unfolded, the plurality of discrete fins in each fin row are arrayed in series diagonally across the jacket, wherein when the jacket is wrapped around the cylindrical structure, each of the discrete fins is substantially parallel along its length with an axis of the cylindrical structure and the plurality of discrete fins in each fin row forms a respective helical strake having an axis substantially parallel to the axis of the cylindrical structure, the helical strake operable to induce turbulence in a fluid flowing past the cylindrical structure, thereby reducing vibration of the cylindrical structure induced by vortex shedding from the fluid flow.

2. The vortex-shedding mitigation assembly of claim 1, wherein:
   (a) the jacket comprises:
      a hook strip of a hook-and-loop fastener along a first edge of the jacket; and
      a loop strip of the hook-and-loop fastener along a second edge of the jacket;
   and
   (b) the jacket is configured such that the hook strip and the loop strip:
      overlap when the jacket is wrapped around the cylindrical structure; and
      bind when compressed together, thereby fastening the jacket to the cylindrical structure.

3. The vortex-shedding mitigation assembly of claim 2, wherein the hook strip is rectangular and has a length and a width, and wherein the length of the hook strip is substantially parallel with the axis of the cylindrical structure when the jacket is wrapped around the cylindrical structure and wherein a total width of the jacket is substantially equal to the width of the hook strip plus the circumference of the cylindrical structure.

4. The vortex-shedding mitigation assembly of claim 3, wherein the length of the hook strip is substantially equal to the length of the jacket.

5. The vortex-shedding mitigation assembly of claim 1, wherein at least some of the plurality of discrete fins of each fin row have a height of about ten percent of the diameter of the cylindrical structure.

6. The vortex-shedding mitigation assembly of claim 1, wherein at least some of the plurality of discrete fins of each fin row have a height of about twenty percent of the diameter of the cylindrical structure.

7. The vortex-shedding mitigation assembly of claim 1, wherein at least some of the plurality of discrete fins of each fin row have a height-to-length ratio of about 3:5.

8. The vortex-shedding mitigation assembly of claim 1, wherein at least some of the plurality of discrete fins of each fin row are comprised of a polymer material.

9. The vortex-shedding mitigation assembly of claim 1, wherein at least some of the plurality of discrete fins of each fin row protrude from the jacket substantially perpendicular to a surface of the cylindrical structure.

10. The vortex-shedding mitigation assembly of claim 1, wherein at least some of the plurality of fins of each fin row are affixed to a respective base member, the respective base member having a substantially flat lower surface substantially parallel with a surface of the cylindrical structure.

11. The vortex-shedding mitigation assembly of claim 1, wherein a length of the jacket is substantially equal to a height of the cylindrical structure.

12. The vortex-shedding mitigation assembly of claim 1, wherein a lead length of each respective helical strake is about five times the diameter of the cylindrical structure.

13. The vortex-shedding mitigation assembly of claim 1, wherein the length of the jacket is equal to or greater than a lead length of the helical strake.

14. The vortex-shedding mitigation assembly of claim 1, wherein each respective helical strake comprises at least fifteen discrete fins per lead length.

15. The vortex-shedding mitigation assembly of claim 1, wherein the jacket is rectangular in shape.

16. A method of mitigating vibration of a cylindrical structure induced by vortex shedding of a fluid flowing past the cylindrical structure, the method comprising:
   introducing in an unfolded state and laying substantially flat under its own weight a jacket comprising a woven, non-metallic material and comprising a plurality of fin rows, each fin row comprising a plurality of discrete fins protruding from the jacket and arrayed in series diagonally across the jacket;
   wrapping the jacket about the cylindrical structure such that each of the discrete fins is substantially parallel along its length with an axis of the cylindrical structure and the plurality of fin rows form a helical strake, the helical strake having an axis substantially parallel to the axis of the cylindrical structure;
   securing the jacket around the cylindrical structure by binding a fastener disposed on the jacket; and
   inducing, by the helical strake, turbulence in the fluid flowing past the cylindrical structure, thereby reducing vibration of the cylindrical structure induced by the vortex shedding.

17. The method of claim 16, wherein the fastener comprises a hook-and-loop fastener and wherein securing of the jacket around the cylindrical structure comprises compressing and thereby binding together a hook strip of a hook-and-loop fastener positioned along a first edge of the jacket with a loop strip of the hook-and-loop fastener positioned along a second edge of the jacket.

18. The method of claim 16, wherein the jacket is rectangular in shape.

* * * * *